US008607563B2

(12) United States Patent
Takahashi

(10) Patent No.: US 8,607,563 B2
(45) Date of Patent: Dec. 17, 2013

(54) RESERVOIR TANK AND BRAKE DEVICE USING THE RESERVOIR TANK

(75) Inventor: Toshiyuki Takahashi, Saitama-Ken (JP)

(73) Assignee: Bosch Corporation, Tokyo (JP)

( * ) Notice: Subject to any disclaimer, the term of this patent is extended or adjusted under 35 U.S.C. 154(b) by 951 days.

(21) Appl. No.: 12/721,831

(22) Filed: Mar. 11, 2010

(65) Prior Publication Data
US 2010/0229547 A1     Sep. 16, 2010

(30) Foreign Application Priority Data
Mar. 11, 2009 (JP) .................................. 2009-058127

(51) Int. Cl.
*B60T 11/22* (2006.01)

(52) U.S. Cl.
USPC .............................................. 60/592; 60/584

(58) Field of Classification Search
USPC ........................................... 60/584, 585, 592
See application file for complete search history.

(56) References Cited

U.S. PATENT DOCUMENTS

| 4,166,431 A | 9/1979 | Pickering |
| 5,957,545 A * | 9/1999 | Sawada et al. .................. 60/585 |
| 7,980,075 B2 * | 7/2011 | Sato ................................ 60/585 |

FOREIGN PATENT DOCUMENTS

| DE | 102007037225 A1 | 1/2009 |
| GB | 2248094 A * | 3/1992 |
| JP | 2001219843 | 8/2001 |
| JP | 2004074837 | 3/2004 |
| WO | 2004078545 A1 | 9/2004 |

* cited by examiner

*Primary Examiner* — Thomas E Lazo
(74) *Attorney, Agent, or Firm* — Michael Best & Friedrich LLP

(57) ABSTRACT

Hydraulic fluid is supplied from a hydraulic fluid supply opening to a hydraulic fluid supply portion. The hydraulic fluid in the hydraulic fluid supply portion is supplied to a primary hydraulic fluid storage chamber and to a secondary hydraulic fluid storage chamber via a hydraulic fluid supply passage. An oblong cylinder-shaped portion that has a chamber is formed between the hydraulic fluid supply opening and the hydraulic fluid supply portion. Further, a volume-augmented chamber forming portion that has a volume-augmented chamber that is communicated with the chamber is disposed in this oblong cylinder-shaped portion. In that case, at least part of the volume-augmented chamber is positioned above a MAX line of the hydraulic fluid.

10 Claims, 5 Drawing Sheets

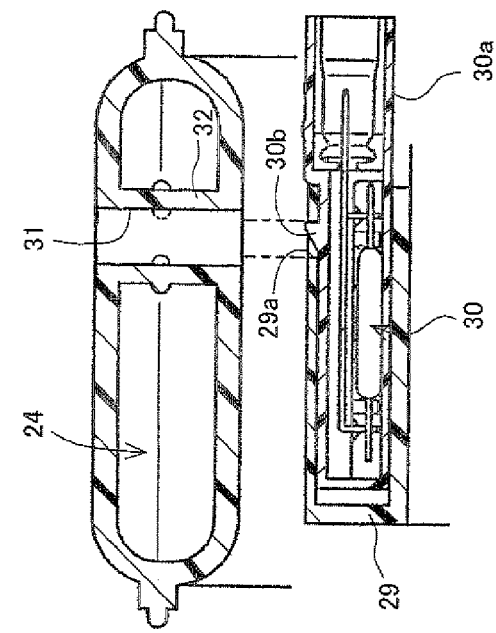
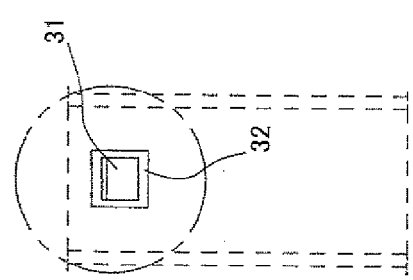
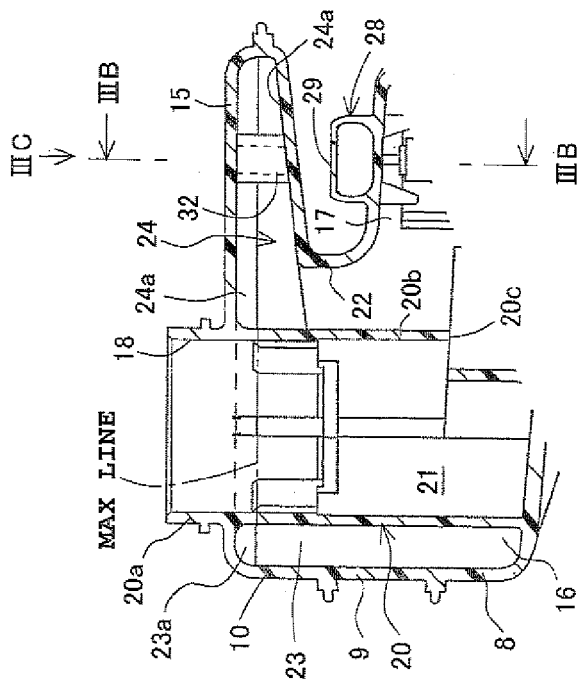
FIG. 3B
FIG. 3C
FIG. 3D
FIG. 3A

US 8,607,563 B2

RESERVOIR TANK AND BRAKE DEVICE USING THE RESERVOIR TANK

BACKGROUND

1. Technical Field

The present invention relates to a reservoir tank that stores hydraulic fluid and is used in a hydraulic pressure-actuated device such as a hydraulic brake device that utilizes hydraulic pressure such as oil pressure and to the technical field of a brake device equipped with the reservoir tank.

2. Related Art

Conventionally, in vehicles such as automobiles, there are vehicles that employ a hydraulic brake device as a hydraulic pressure-actuated device that utilizes hydraulic pressure. In this hydraulic brake device, there is used a reservoir tank that stores hydraulic fluid supplied to a master cylinder that generates hydraulic pressure.

As a conventional reservoir tank, there is known a reservoir tank that is equipped with a hydraulic fluid supply portion to which hydraulic fluid is supplied from a hydraulic fluid supply opening that is an open end of a cylindrical member via this cylindrical member, a hydraulic fluid storage chamber that stores the hydraulic fluid supplied to a fluid chamber of a master cylinder, a hydraulic fluid passage that allows the hydraulic fluid supply portion and the hydraulic fluid storage chamber to be communicated with each other and through which the hydraulic fluid flows from the hydraulic fluid supply portion to the hydraulic fluid storage chamber, and a cap that opens and closes the hydraulic fluid supply opening (e.g., see JP-A-2006-519728).

In the reservoir tank described in JP-A-2006-519728, in a state where the reservoir tank has been installed in a vehicle, the hydraulic fluid supply opening and the hydraulic fluid supply portion are positioned on the vehicle front side of the hydraulic fluid storage chamber. The reservoir tank is installed in a limited space of a relatively narrow engine room; thus, sometimes other parts of the vehicle such as a dashboard are positioned above the hydraulic fluid storage chamber and replenishment of the inside of the reservoir tank with the hydraulic fluid becomes difficult, so the hydraulic fluid supply opening and the hydraulic fluid supply portion are disposed on the vehicle front side of the hydraulic fluid storage chamber in order to make it easier to replenish the reservoir tank with the hydraulic fluid.

In the reservoir tank described in JP-A-2006-519728, in a state where the reservoir tank has been installed in a vehicle, the maximum storage level (MAX line) of the hydraulic fluid is set in a middle position in the height direction (vertical direction) of the hydraulic fluid supply portion below the cylindrical member. By setting the MAX line in this manner, an air chamber is formed inside the hydraulic fluid supply portion and inside the cylindrical member above the hydraulic fluid stored to the MAX line. This air chamber is ordinarily set to be at atmospheric pressure, and when the volume of the hydraulic fluid changes because of a rise in the temperature of the hydraulic fluid or the like, the air inside the air chamber is supplied and exhausted by a cap seal disposed in the hydraulic fluid supply opening, whereby the volume change in the hydraulic fluid is absorbed.

In order to supply hydraulic fluid to a reservoir tank installed in a vehicle, usually a hydraulic fluid pressure-feed filling device is used to fill the inside of the reservoir tank with the hydraulic fluid. In that case, reservoir tanks of various shapes and structures are manufactured depending on the vehicle type. Consequently, the distance between the MAX line in the reservoir tank and the hydraulic fluid supply opening variously differ, so a pressure-feed filling device instrument cannot be commonly used in the different reservoir tanks and is created depending on the type of the reservoir tank.

Incidentally, depending on the use environment of the vehicle (e.g., a large temperature rise inside the engine room), an even larger air chamber than the one in the reservoir tank described in JP-T-2006-519728 is required. Thus, it is conceivable to increase the volume of the air chamber by maintaining the MAX line as is and simply increasing the length of the cylindrical member and the height of the portion of the hydraulic fluid supply portion above the MAX line.

However, when the length of the cylindrical member and the height of the hydraulic fluid supply portion are simply increased, the height of the hydraulic fluid supply opening from the MAX line also ends up becoming higher. In other words, the distance between the MAX line and the hydraulic fluid supply opening becomes longer. For this reason, there is the problem that the pressure-feed filling device instrument cannot be used as is, which necessitates changing the pressure-feed filling device instrument—that is, creating a new instrument Moreover, there is also the problem that, when the vehicle production line is a line that continuously produces different vehicle types, various types of pressure-feed filling device instruments have to be prepared for the production line, and so not only does work become cumbersome but there arises the potential to misuse an instrument.

SUMMARY

The present invention has been made in light of this circumstance, and it is an object thereof to provide a reservoir tank, and a brake device using the reservoir tank, with which the volume of an air chamber above hydraulic fluid can be increased without changing the height of a hydraulic fluid supply opening from a MAX line.

In order to address the problem described above, a reservoir tank of the present invention comprises at least: a hydraulic fluid supply opening; a hydraulic fluid supply portion to which hydraulic fluid is supplied from this hydraulic fluid supply opening; a hydraulic fluid storage chamber that stores the hydraulic fluid as a result of the hydraulic fluid in this hydraulic fluid supply portion being supplied thereto via a hydraulic fluid passage; and a cylindrical portion that is disposed between the hydraulic fluid supply opening and the hydraulic fluid supply portion and has inside a chamber that is communicated with the hydraulic fluid supply portion, wherein a volume-augmented chamber forming portion that has inside a volume-augmented chamber that is communicated with the chamber is disposed in the cylindrical portion, and at least part of the volume-augmented chamber is positioned above a MAX line that is a maximum storage level of the hydraulic fluid.

Further, the reservoir tank of the present invention may be configured such that the volume-augmented chamber forming portion is disposed so as to extend horizontally or substantially horizontally from the cylindrical portion.

Moreover, the reservoir tank of the present invention may be configured such that the volume-augmented chamber forming portion is disposed so as to extend into a dead space when the reservoir tank is installed in a vehicle.

Moreover, the reservoir tank of the present invention may be configured such that the volume-augmented chamber forming portion is disposed so as to extend above the hydraulic fluid passage.

Moreover, the reservoir tank of the present invention may be configured such that a bottom portion of the volume-augmented chamber slants so as to become a downward slope toward the chamber inside the cylindrical portion.

A brake device of the present invention comprises at least: a reservoir tank that stores hydraulic fluid; a master cylinder to which the hydraulic fluid inside the reservoir tank is supplied and which generates brake pressure when it is actuated; and a brake cylinder that is actuated by hydraulic pressure from the master cylinder, wherein the reservoir tank is any one of the reservoir tanks of the present invention.

According to the reservoir tank of the present invention configured in this manner, the volume-augmented chamber forming portion that has inside the volume-augmented chamber that is communicated with the chamber of the cylindrical portion is disposed in the cylindrical portion that is disposed between the hydraulic fluid supply opening and the hydraulic fluid supply portion, to which the hydraulic fluid is supplied from this hydraulic fluid supply opening and which supplies this hydraulic fluid to the hydraulic fluid storage chamber, and has the chamber that is communicated with the hydraulic fluid supply portion, and at least part of this volume-augmented chamber is positioned above the MAX line of the hydraulic fluid. Thus, in a state where the hydraulic fluid fills the reservoir tank to the MAX line, a new air chamber can be formed inside at least part of the volume-augmented chamber in addition to the air chamber that is formed inside the cylindrical portion. Consequently, when the temperature of the hydraulic fluid rises and the volume of the hydraulic fluid increases because of the use environment described above, this increased volume change in the hydraulic fluid can be absorbed by the conventional air chamber and can also be absorbed by the new air chamber. As a result, even when the increase change in the volume of the hydraulic fluid is relatively large, the increase change in the volume of the hydraulic fluid can be more reliably absorbed, and a situation where the hydraulic fluid leaks out to the outside from the hydraulic fluid supply opening can be suppressed.

Further, according to the reservoir tank of the present invention, the volume-augmented chamber forming portion is disposed so as to extend horizontally or substantially horizontally from the cylindrical portion, so even when the volume-augmented chamber forming portion is disposed, the distance between the hydraulic fluid supply opening and the MAX line can be set to be the same as in a conventional reservoir used in a vehicle in which the reservoir tank of the present invention is used. Thus, as a pressure-feed filling device instrument that fills the inside of the reservoir tank with the hydraulic fluid, a conventional pressure-feed filling device instrument can be used as is, so that the pressure-feed filling device instrument does not have to be changed. Consequently, the number of types of pressure-feed filling device instruments does not increase by that amount, so when the vehicle production line is a line that continuously produces different vehicle types, various types of pressure-feed filling device instruments do not have to be prepared for the production line even when the reservoir tank having the volume-augmented chamber forming portion is used. As a result, the work of filling the reservoir tank with the hydraulic fluid becomes simple and instrument misuse can be suppressed.

Moreover, according to the reservoir tank of the present invention, the volume-augmented chamber forming portion is disposed so as to extend horizontally or substantially horizontally from the cylindrical portion and into the dead space when the reservoir tank is installed in a vehicle, so even when the volume-augmented chamber forming portion is disposed, the reservoir tank can be efficiently installed in the limited space of a relatively narrow engine room without interfering with other parts. In particular, the volume-augmented chamber forming portion is disposed so as to extend above the hydraulic fluid passage positioned between the hydraulic fluid supply portion and the hydraulic fluid storage chamber. The space above this hydraulic fluid passage becomes dead space, so the entire reservoir tank can be formed in substantially the same size as that of a conventional reservoir tank even when the volume-augmented chamber forming portion is disposed, and an increase in the size of the reservoir tank can be suppressed. Consequently, the reservoir tank can be even more efficiently installed in the limited space of the engine room.

Moreover, according to the reservoir tank of the present invention, the bottom portion of the volume-augmented chamber slants so as to become a downward slope toward the chamber inside the cylindrical portion. Thus, it becomes possible to more reliably cause the hydraulic fluid entering the inside of the volume-augmented chamber to flow toward the chamber—that is, the hydraulic fluid supply portion—when the quantity of the hydraulic fluid inside the reservoir tank decreases.

According to the brake device equipped with the reservoir tank of the present invention, even in a vehicle where the temperature of the engine room becomes relatively high, by using the reservoir tank of the present invention in the brake device, leakage of the brake fluid that is the hydraulic fluid from the hydraulic fluid supply opening can be suppressed so that the brakes can be more reliably actuated, and contamination inside the engine room can be prevented.

BRIEF DESCRIPTION OF THE DRAWINGS

FIG. 3A is a partial cross-sectional view along line IIIA-IIIA in FIG. 2B, FIG. 3B is a partial cross-sectional view along line IIIB-IIIB in FIG. 3A, FIG. 30 is a partial view seen from the direction of arrow IIIC, and FIG. 3D is a partial cross-sectional view along line IIID-IIID in FIG. 2B;

DETAILED DESCRIPTION

Modes for implementing the present invention will be described below using the drawings. In the description below, horizontal and vertical refer to a state where a reservoir tank is installed in a horizontal or substantially horizontal vehicle, and a maximum storage level (MAX line) and a minimum storage level (MIN line) of hydraulic fluid are horizontal lines in the same state of the reservoir tank.

Figure 1:
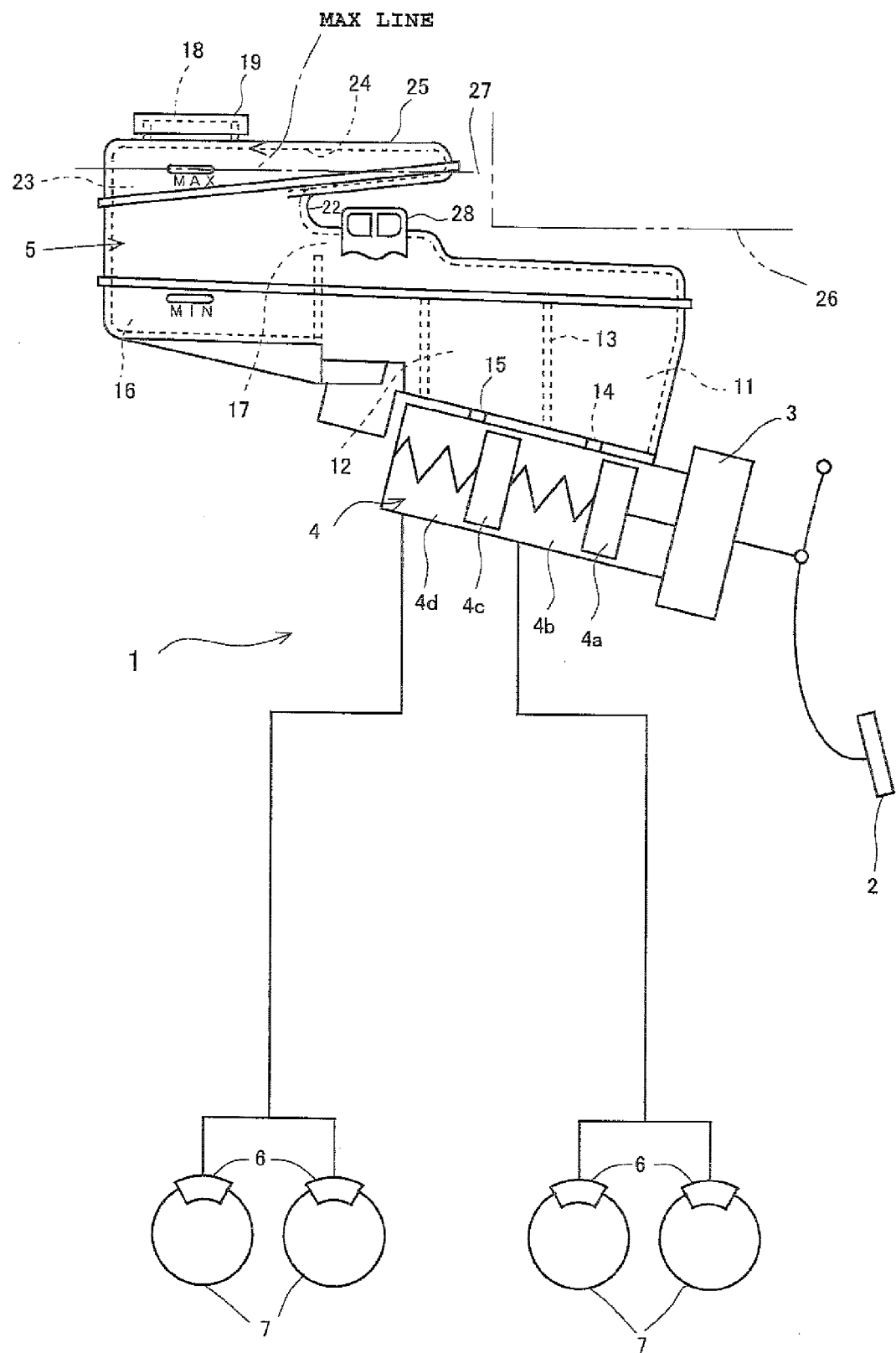
FIG. 1 is a view schematically showing a brake device equipped with one example of a mode of implementing a reservoir tank pertaining to the present invention.

FIG. 1 is a view schematically showing a brake device equipped with one example of a mode of implementing a reservoir tank pertaining to the present invention.

As shown in FIG. 1, a hydraulic brake device 1 of this example is basically the same as a conventionally known common dual-system hydraulic brake device. That is, the hydraulic brake device 1 is equipped with a brake pedal 2, a booster 3, a tandem master cylinder 4, a reservoir tank 5 and brake cylinders 6.

When a driver steps on the brake pedal 2, the booster 3 is actuated to boost, by a predetermined servo ratio, and output the pedal force. Because of the output of this booster 3, a primary piston 4a of the tandem master cylinder 4 is actuated to feed the hydraulic fluid in a primary fluid chamber 4b to the brake cylinders 6 of one system and a secondary piston 4c is actuated to feed the hydraulic fluid in a secondary fluid chamber 4d to the brake cylinders 6 of the other system. When the loss stroke of each brake system disappears, the tandem master cylinder 4 generates hydraulic pressure. The hydraulic pressure of the tandem master cylinder 4 is transmitted to each of the brake cylinders 6, each of the brake cylinders 6 generates brake force, and a brake acts on each wheel 7.

Figure 2B:
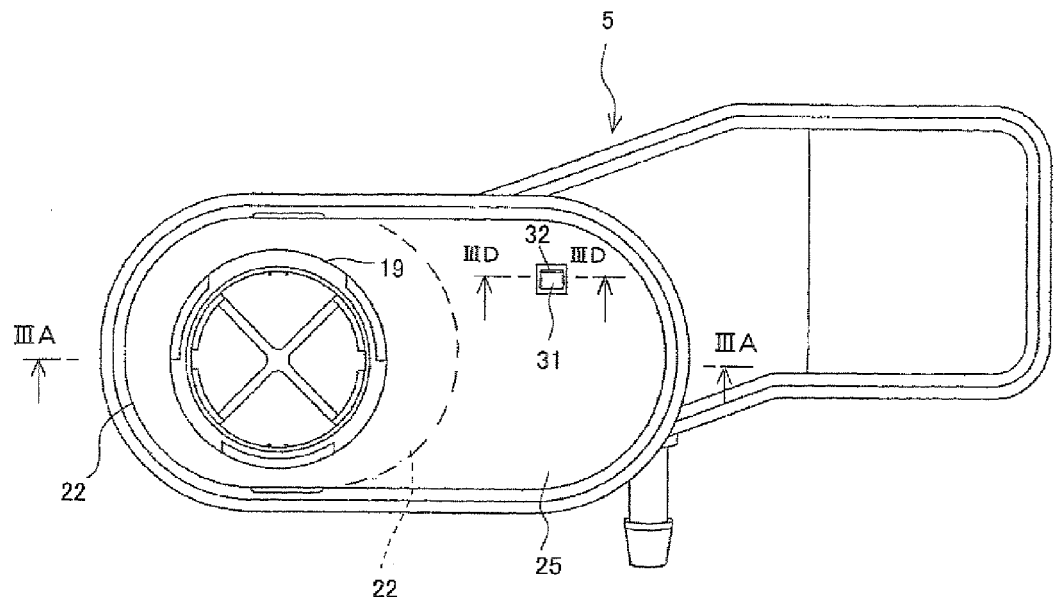
FIG. 2A and FIG. 2B show the example of the mode of implementing the reservoir tank pertaining to the present invention, with FIG. 2A being a front view and FIG. 2B being a plan view.
Figure 2A:
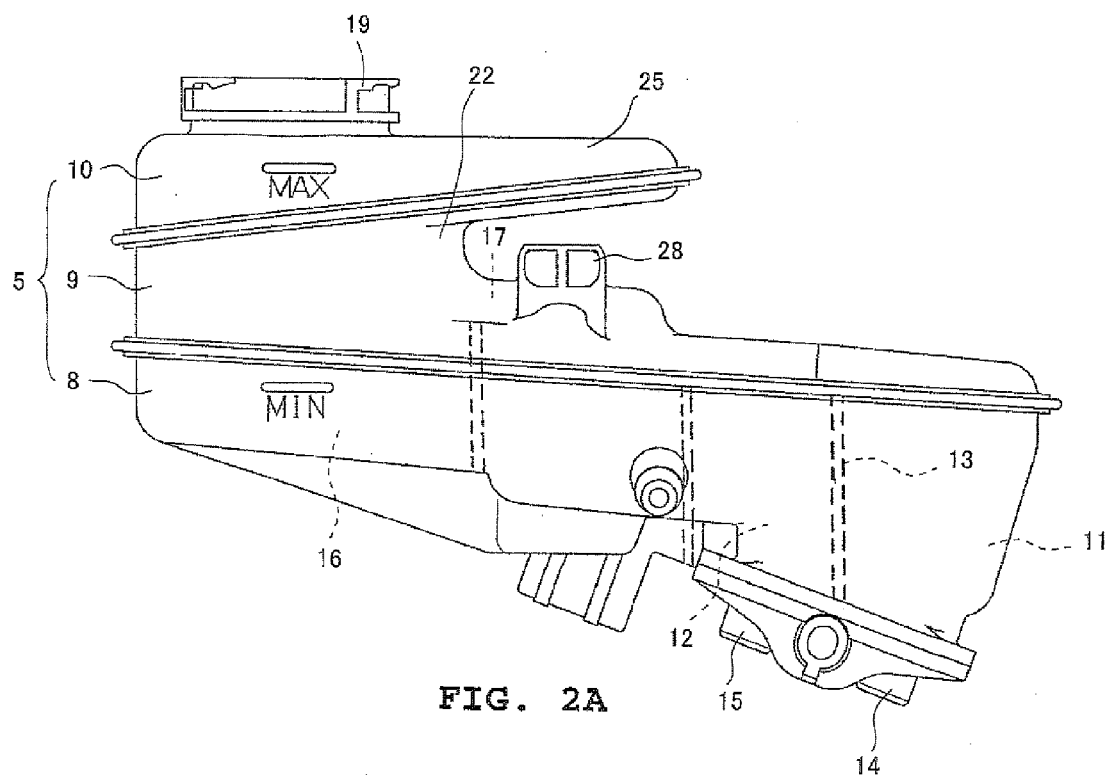

Incidentally, the reservoir tank 5 used in the brake device 1 of this example has, as shown in FIG. 2A and FIG. 2B, three bodies: a lower body 8; a middle body 9 that is welded in a liquid-tight manner along a horizontal plane or a substantially horizontal plane by heat and pressure to the open portion of the upper end of this lower body 8; and an upper body 10 that is similarly welded in a liquid-tight manner along a horizontal or a substantially horizontal plane by heat and pressure to the open portion of the upper end of this middle body 9. In the reservoir tank 5 of this example, in a state where the tandem master cylinder 4 to which the reservoir tank 5 is attached is attached to the vehicle body and in a state where the vehicle body is horizontal, a minimum storage level (MIN line) of the hydraulic fluid is set in the lower body 8 and, similarly, a maximum storage level (MAX line) of the hydraulic fluid is set in the upper body 10.

In the right side portion of the lower body 8 in FIG. 2A and FIG. 2B, there are disposed a primary hydraulic fluid storage chamber 11 and a secondary hydraulic fluid storage chamber 12. The primary hydraulic fluid storage chamber 11 and the secondary hydraulic fluid storage chamber 12 are partitioned by a partition wall 13. However, the tops of the hydraulic fluid storage chambers 11 and 12 are open, and in a state where the middle body 9 has been welded to the lower body 8, the primary hydraulic fluid storage chamber 11 and the secondary hydraulic fluid storage chamber 12 are always communicated with each other through a gap between the upper end of the partition wall 13 and the lower surface of the upper wall of the middle body 9. As shown in FIG. 2A, in the bottom of the primary hydraulic fluid storage chamber 11, there is disposed a hydraulic fluid feed opening 14 that supplies the hydraulic fluid to the primary fluid chamber 4b of the tandem master cylinder 4, and in the bottom of the secondary hydraulic fluid storage chamber 12, there is disposed a hydraulic fluid feed opening 15 that supplies the hydraulic fluid to the secondary fluid chamber 4d of the tandem master cylinder 4.

In the left side portion of the reservoir tank 5 in FIG. 2A, as shown in FIG. 1, FIG. 2A and FIG. 3A, there is disposed a hydraulic fluid supply portion 16. The hydraulic fluid supply portion 16 is defined by the lower body 8 and the middle body 9, and this hydraulic fluid supply portion 16 is always communicated with the primary hydraulic fluid storage chamber 11 and the secondary hydraulic fluid storage chamber 12 by a hydraulic fluid passage 17. This hydraulic fluid passage 17 is disposed in the left-right direction center portion of the reservoir tank 5 in FIG. 2A and is formed by the lower body 8 and the middle body 9.

As shown in FIG. 3A, in the upper body 10, there is disposed a hydraulic fluid supply opening 18 for supplying the hydraulic fluid to the inside of the reservoir tank 5. As shown in FIG. 2A and FIG. 2B, in the hydraulic fluid supply opening 18, there are disposed a cap 19 that opens and closes this hydraulic fluid supply opening 18 and a conventionally known cap seal (not shown). The hydraulic fluid supply opening 18 is placed above the hydraulic fluid supply portion 16 of the reservoir tank 5. The hydraulic fluid supply opening 18 and the hydraulic fluid supply portion 16 are communicated with each other through a hydraulic fluid supply passage 21 that is formed by a circular cylinder-shaped member 20. In that case, the circular cylinder-shaped member 20 comprises an outside circular cylinder-shaped portion 20a that projects outside the reservoir tank 5 and an inside circular cylinder-shaped portion 20b that projects inside the reservoir tank 5. Consequently, the hydraulic fluid supply opening 18 is disposed in the open end of the outside circular cylinder-shaped portion 20a, and the hydraulic fluid supply passage 21 is formed through the outside circular cylinder-shaped portion 20a and the reservoir tank 5. Additionally, the hydraulic fluid supply portion 16 is disposed around the outer periphery of the circular cylinder-shaped member 20. Additionally, an opening 20c is disposed in the lower half portion of the inside circular cylinder-shaped portion 20b, and the hydraulic fluid supply passage 21 and the hydraulic fluid supply portion 16 are always communicated with each other through this opening 20c. In this manner, in a state where the reservoir tank 5 has been installed in a vehicle, the hydraulic fluid supply opening 18 and the hydraulic fluid supply portion 16 are positioned on the vehicle front side of the primary hydraulic fluid storage chamber 11 and the secondary hydraulic fluid storage chamber 12.

Further, the distances in the vertical direction from the hydraulic fluid supply opening 18 of the reservoir tank 5 of this example to the MIN line and to the MAX line are set to be the same as those in a conventional reservoir tank installed in a vehicle in which this reservoir tank 5 is installed.

As shown in FIG. 3A, the upper portion of the middle body 9 and the upper body 10 are positioned below the hydraulic fluid supply opening 18 and are configured to be an oblong cylinder-shaped portion 22 (which corresponds to a cylindrical portion of the present invention). Consequently, the oblong cylinder-shaped portion 22 is disposed between the hydraulic fluid supply opening 18 and the hydraulic fluid supply portion 16. Further, between the inner peripheral surface of the oblong cylinder-shaped portion 22 and the outer peripheral surface of the upper half portion of the inside circular cylinder-shaped portion 20b, there is disposed an annular chamber 23 that is positioned above the hydraulic fluid supply portion 16 and is always communicated with this hydraulic fluid supply portion 16. Additionally, on the upper end portion of the oblong cylinder-shaped portion 22, there is disposed a volume-augmented chamber forming portion 25 having inside a volume-augmented chamber 24 that is always communicated with the chamber 23. As shown in FIG. 1, this volume-augmented chamber forming portion 25 is disposed so as to extend horizontally or substantially horizontally from the oblong cylinder-shaped portion 22 into a dead space 27—that is, in this example, a space above the hydraulic fluid passage 17 of the middle body 9—where it does not interfere with another part (e.g., a dashboard) 26 when the reservoir tank 5 has been installed in a vehicle.

The inside circular cylinder-shaped portion 20b of the circular cylinder-shaped member 20 is not invariably necessary and can also be omitted. When the inside circular cylinder-shaped portion 20b is omitted, the configural portions of the hydraulic fluid supply opening 18, the oblong cylinder-shaped portion 22 and the hydraulic fluid supply portion 16 come to have almost the same configurations as those of the reservoir tank described in JP-A-2006-519728 described above. Further, in this case, the cross section of the chamber 23 is no longer annular but comes to have the shape of the inner peripheral surface of the oblong cylinder-shaped portion 22.

The volume-augmented chamber 24 is disposed so as to be positioned across the top and bottom of the MAX line. That is, in the state shown in FIG. 3A where the hydraulic fluid fills the reservoir tank 5 to the MAX line, the hydraulic fluid enters the inside of the volume-augmented chamber 24 and an air chamber 24a is formed above the fluid level of the hydraulic fluid inside the volume-augmented chamber 24. At this time, an air chamber 23a is also formed above the fluid level of the hydraulic fluid inside the chamber 23 of the oblong cylinder-shaped portion 22 like in a conventional reservoir tank including the reservoir tank described in JP-A-2006-519728 described above. Additionally, the air chamber 24a inside the volume-augmented chamber 24 is communicated with the same air chamber 23a as conventionally.

Moreover, a bottom portion 24b of the volume-augmented chamber 24 slants so as to become a downward slope toward the chamber 23. Thus, it is made easy for the hydraulic fluid entering the inside of the volume-augmented chamber 24 to flow toward the hydraulic fluid supply portion 16 when the fluid level of the hydraulic fluid supply portion 16 drops.

As shown in FIG. 3A, on the upper surface of the middle body 9 below the volume-augmented chamber forming portion 25, there is disposed a fluid quantity detection unit 28 that detects the hydraulic fluid quantity inside the reservoir tank 5. As shown in FIG. 3B, the fluid quantity detection unit 28 has a bottomed, substantially square cylinder-shaped switch housing portion 29 that is disposed on the middle body 9 and a normally-closed reed switch 30 that is housed in this switch housing portion 29. When the fluid level of the hydraulic fluid inside the reservoir tank 5 is higher than a fluid level required for warning indication (slightly higher than MIN), this reed switch 30 is switched ON by a magnet disposed on a float that moves up and down depending on the fluid level of the hydraulic fluid, and warning indication is not performed. Further, when the fluid level of the hydraulic fluid becomes equal to or less than the fluid level required for warning indication, the magnet falls together with the float, the reed switch 30 switches OFF, and warning indication is performed.

Incidentally, the reed switch 30 is attached as a result of an elastic locking claw 30b disposed on a case 30a of the reed switch 30 elastically locking in a locking hole 29a of the switch housing portion 29. As described above, the reservoir tank 5 is formed as a result of the lower body 8, the middle body 9 and the upper body 10 that have been plastic-molded being welded together by heat and pressure. At this time, in the plastic molding step and the welding step, sometimes the locking hole 29a is not formed in these steps but is processed and formed by after-processing after the welding step.

However, in this case, the locking hole 29a is disposed directly below the volume-augmented chamber forming portion 25—that is, the locking hole 29a is covered by the volume-augmented chamber forming portion 25—and so it is difficult to process and form this locking hole 29a in the switch housing portion 29 by after-processing. Thus, as shown in FIG. 2A and FIG. 3B to FIG. 3D, in the reservoir tank 5 of this example, a tool insertion hole 31 that allows a tool for disposing the locking hole 29a in the switch housing portion to be inserted therethrough is formed in the volume-augmented chamber forming portion 25 so as to penetrate the volume-augmented chamber forming portion 25 from its upper surface to its lower surface and so as to face the formation position of the locking hole 29a. This tool insertion hole is formed in a cross-sectionally square shape by a cross-sectionally square-shaped square cylinder-shaped member 32 and is blocked in a liquid-tight manner from the volume-augmented chamber 24.

According to the reservoir tank 5 of this example configured in this manner, the volume-augmented chamber 24 is disposed so as to extend horizontally or substantially horizontally from the oblong cylinder-shaped portion 22 between the hydraulic fluid supply opening 18 and the hydraulic fluid supply portion 16 and so as to be positioned across the top and bottom of the MAX line, so in a state where the hydraulic fluid fills the reservoir tank 5 to the MAX line, the new air chamber 24a can be formed above the fluid level of the hydraulic fluid inside the volume-augmented chamber 24 in addition to the conventional air chamber 23a formed above the fluid level of the hydraulic fluid inside the oblong cylinder-shaped portion 22. Thus, when the temperature of the hydraulic fluid rises and the volume of the hydraulic fluid increases because of the use environment described above, this increased volume change in the hydraulic fluid can be absorbed by the conventional air chamber 23a and can also be absorbed by the new air chamber 24a. Consequently, even when the increase change in the volume of the hydraulic fluid is relatively large, the increase change in the volume of the hydraulic fluid can be more reliably absorbed, and a situation where the hydraulic fluid leaks out to the outside from the hydraulic fluid supply opening 18 and the cap 19 can be suppressed.

Further, the volume-augmented chamber forming portion 25 is disposed so as to extend horizontally or substantially horizontally from the oblong cylinder-shaped portion 22 between the hydraulic fluid supply opening 18 and the hydraulic fluid supply portion 16, so even when the volume-augmented chamber forming portion 25 is disposed, the distance between the hydraulic fluid supply opening 18 and the MAX line can be set to be the same as in a conventional reservoir. Thus, as a pressure-feed filling device instrument that fills the inside of the reservoir tank 5 with the hydraulic fluid, a conventional pressure-feed filling device instrument can be used as is, so that the pressure-feed filling device instrument does not have to be changed. Consequently, the number of types of pressure-feed filling device instruments does not increase by that amount, so when the vehicle production line is a line that continuously produces different vehicle types, various types of pressure-feed filling device instruments do not have to be prepared for the production line even when the reservoir tank 5 having the volume-augmented chamber forming portion 25 is used. As a result, the work of filling the reservoir tank 5 with the hydraulic fluid becomes simple and instrument misuse can be suppressed.

Moreover, the volume-augmented chamber forming portion 25 is disposed so as to extend above the hydraulic fluid passage 17 in the space that becomes dead space when the reservoir tank 5 is installed in a vehicle, so the entire reservoir tank 5 can be formed in substantially the same size as that of a conventional reservoir tank even when the volume-augmented chamber forming portion 25 is disposed, and an increase in the size of the reservoir tank 5 can be suppressed. Consequently, the reservoir tank 5 can be efficiently installed in the limited space of a relatively narrow engine room without interfering with other parts.

Moreover, the bottom portion 24b of the volume-augmented chamber 24 slants so as to become a downward slope toward the chamber 23 inside the oblong cylinder-shaped portion 22, so it becomes possible to more reliably cause the hydraulic fluid entering the inside of the volume-augmented chamber 24 to flow toward the chamber 23—that is, the hydraulic fluid supply portion 16—when the quantity of the hydraulic fluid inside the reservoir tank 5 decreases.

Moreover, the tool insertion hole 31 is formed in the volume-augmented chamber forming portion 25 so as to penetrate the volume-augmented chamber forming portion 25 from its upper surface to its lower surface and so as to face the formation position of the locking hole 29a that locks the elastic locking claw 30b of the reed switch 30, so when the locking hole 29a is not formed and the formation position of the locking hole 29a is covered by the volume-augmented chamber forming portion 25 during the molding process of the reservoir tank 5, the tool insertion hole 31 can be utilized to form the locking hole 29a in the reservoir tank 5 by after-processing after the molding process of the reservoir tank 5.

According to the hydraulic brake device 1 equipped with the reservoir tank 5 of this example, even in a vehicle where the temperature of the engine room becomes relatively high, by using the reservoir tank 5 of this example in the hydraulic brake device 1, leakage of the brake fluid that is the hydraulic fluid from the hydraulic fluid supply opening 18 capped by the cap 19 can be suppressed so that the brakes can be more reliably actuated, and contamination inside the engine room can be prevented.

Figure 4B:
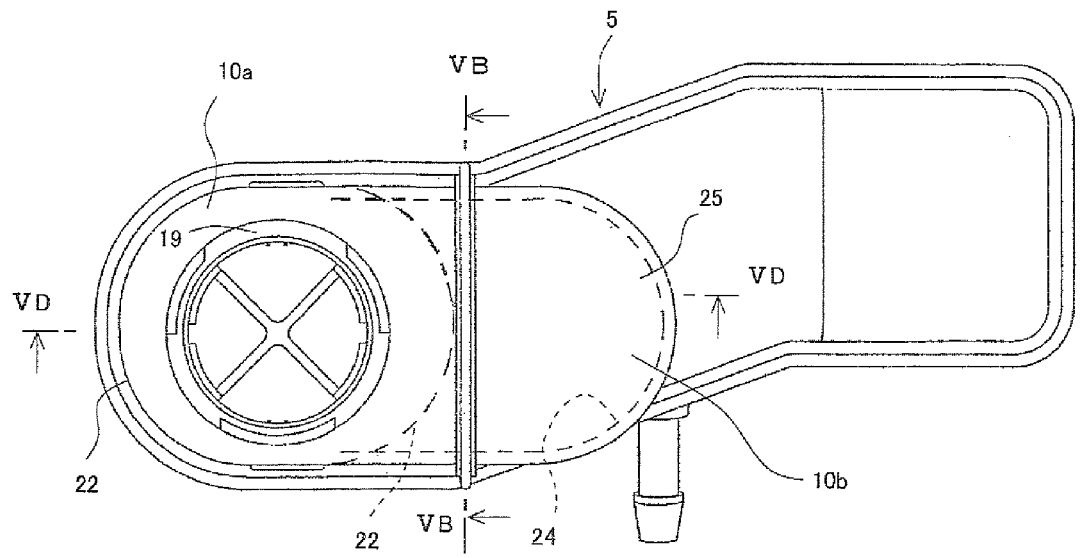
FIG. 4A and FIG. 4B show another example of a mode of implementing the reservoir tank pertaining to the present invention, with FIG. 4A being a front view and FIG. 4B being a plan view.
Figure 4A:
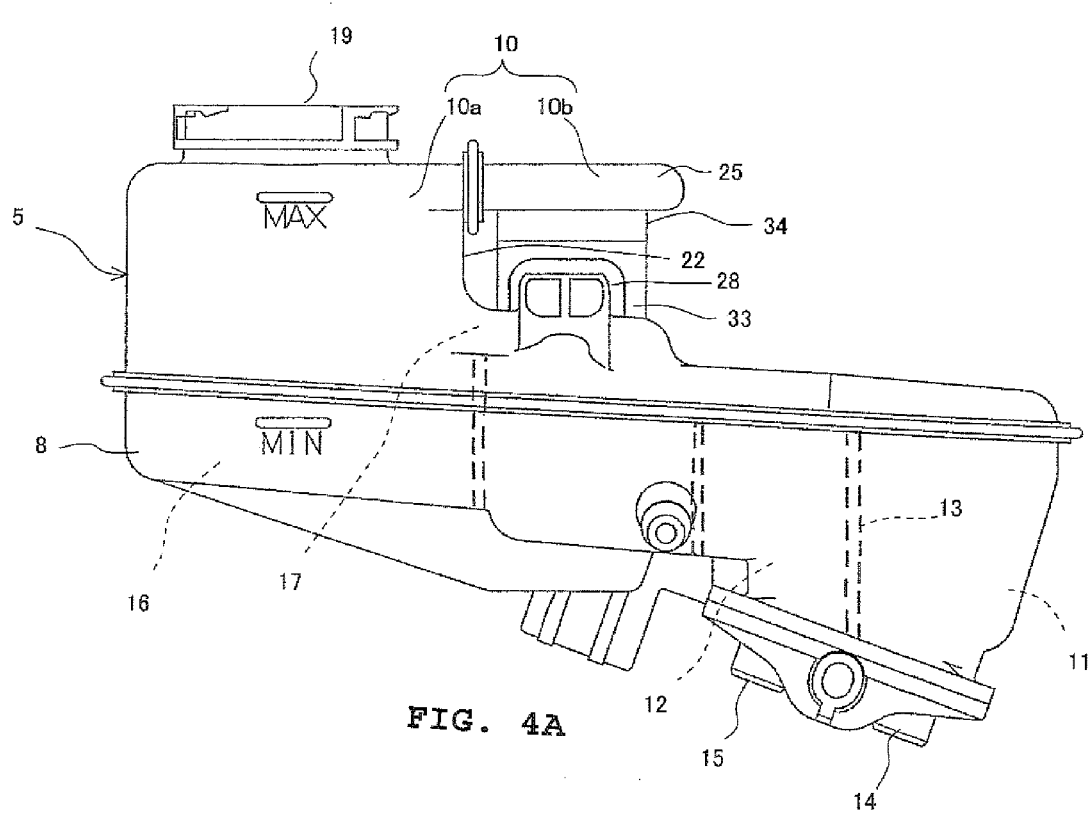

FIG. 4A and FIG. 43 show another example of a mode of implementing the reservoir tank pertaining to the present invention, with FIG. 4A being a front view and FIG. 4B being a plan view.

Figure 5B:
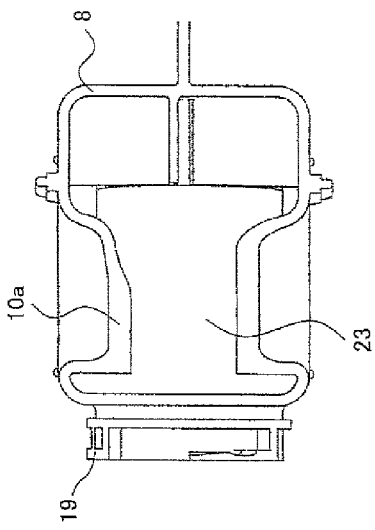
FIG. 5B is a partial cross-sectional view along line VB-VB in FIG. 4B.
Figure 5D:
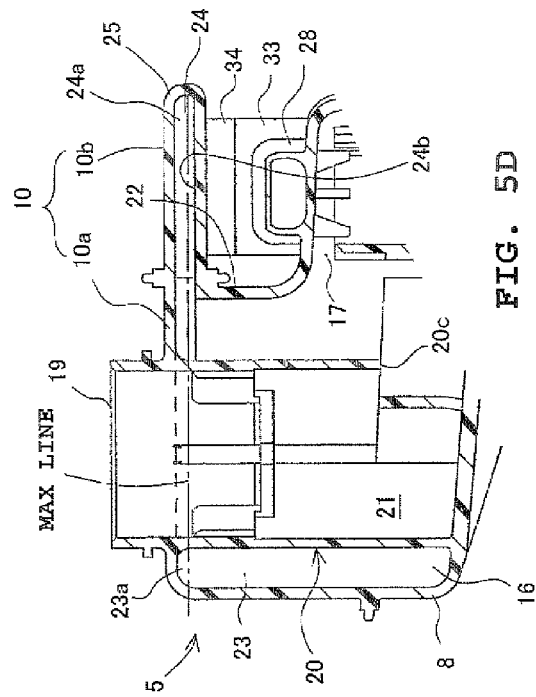
FIG. 5D is a partial cross-sectional view along line VD-VD in FIG. 4B.
Figure 5A:
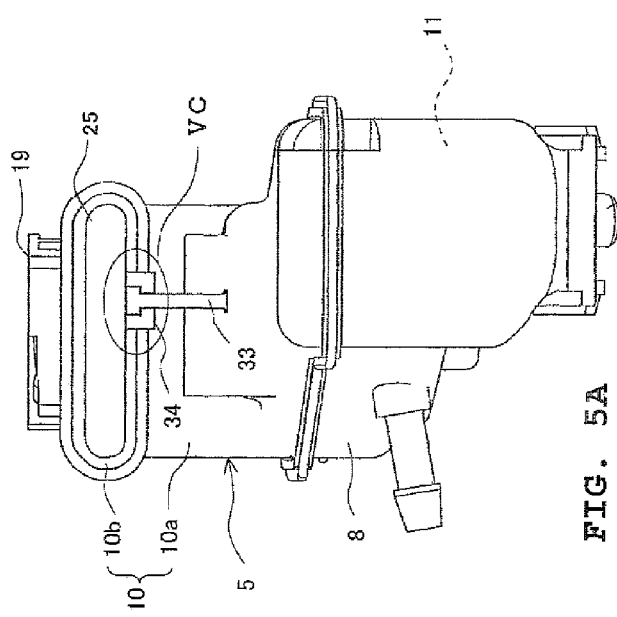
FIG. 5A is a right side view in FIG. 4A.
Figure 5C:
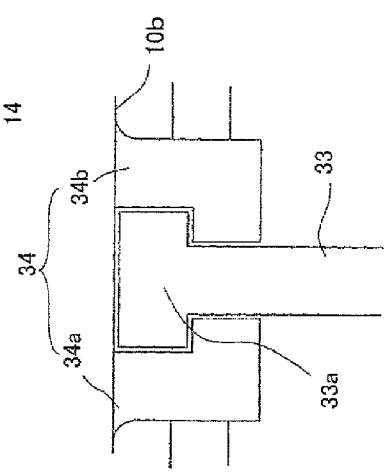
FIG. 5C is an enlarged view of portion VC in FIG. 5A.

In the example described above, the reservoir tank 5 has the lower body 8, the middle body 9 and the upper body 10, and these are welded together in a horizontal plane or a substantially horizontal plane, but as shown in FIG. 4A and FIG. 4B, the reservoir tank 5 of this example does not have the middle body 9 but has the lower body 8 and the upper body 10. In that case, the upper body 10 is configured from a first upper body 10a and a second upper body 10b. Additionally, the first upper body 10a configures the middle body 9, the upper body 10 and part of the volume-augmented chamber forming portion 25 of the example described above, and the second upper body 10b configures the remaining part of the volume-augmented chamber forming portion 25 of the example described above. As shown in FIG. 5D, the bottom portion 24b of the volume-augmented chamber 24 inside the volume-augmented chamber forming portion 25 of this example is configured to be horizontal and does not slant like in the example described above.

Consequently, the lower body 8 and the first upper body 10a are welded together in a horizontal plane or a substantially horizontal plane like in the case of the lower body 8 and the middle body 9 of the example described above. Further, the first upper body 10a and the second upper body 10b are welded together in a vertical plane or a substantially vertically plane. In that case, it is necessary to keep the second upper body 10b horizontal when welding together the first upper body 10a and the second upper body 10b, but keeping the second upper body 10b horizontal is a bother. Thus, on the first upper body 10a, there is disposed a T-shaped guide rail 33 that keeps the second upper body 10b horizontal and brings the welding surface of the second upper body 10b face-to-face with the welding surface of the first upper body 10a. This guide rail 33 is disposed so as to extend along the vehicle front-rear direction on the upper surface of the first upper body 10a below the volume-augmented chamber forming portion 25. Further, on the lower surface of the second upper body 10b, there is disposed a guide 34 comprising a pair of members 34a and 34b, one of which has an L shape and the other of which has an inverted L shape. Additionally, the pair of members 34a and 34b slidably engage a T-shaped portion 33a of the upper end portion of the guide rail 33, whereby the second upper body 10b is guided by the guide rail 33 and is moved toward the welding surface of the first upper body 10a while being kept horizontal.

The guide rail 33 and the guide 34 are not removed even after the molding process of the reservoir tank 5 but remain engaged with each other. Consequently, the guide rail 33 functions as a load support portion that supports the load of the second upper body 10b, and the guide rail 33 and the guide 34 function as a swing regulating portion that suppresses swinging of the second upper body 10b in the horizontal direction and the vertical direction.

The other configurations of the reservoir tank 5 of this example and the other configurations of the brake device 1 equipped with the reservoir tank 5 of this example are substantially the same as those of the example described above. Further, in the reservoir tank 5 of this example, welding is performed in a vertical plane, so the molding process of the reservoir tank 5 becomes more cumbersome than in the example described above by that amount. The other action and effects of the reservoir tank 5 of this example are substantially the same as those of the example described above.

The present invention is not limited to each of the examples described above, and various design changes are possible. For example, the volume-augmented chamber 24 is not limited to being disposed so as to extend above the hydraulic fluid passage 17 of the middle body 9 and can also be disposed so as to extend horizontally or substantially horizontally from the oblong cylinder-shaped portion 22 in another arbitrary direction. Further, the volume-augmented chamber 24 can also be disposed so as to extend horizontally or substantially horizontally across the entire periphery of the outer peripheral surface of the oblong cylinder-shaped portion 22. Moreover, as long as the air chamber 24a can be formed in a state where the hydraulic fluid fills the reservoir tank 5 to the MAX line, the volume-augmented chamber 24 can also be disposed such that the entire volume-augmented chamber 24 is positioned above the MAX line. In this case also, it goes without saying that the volume-augmented chamber 24 is disposed so as to extend horizontally or substantially horizontally from the oblong cylinder-shaped portion 22 and is disposed below the hydraulic fluid supply opening 18. That is, in the reservoir tank of the present invention, it suffices as long as at least part of the volume-augmented chamber 24 is positioned above the MAX line. The point is that various design changes are possible within the scope of the items set forth in the claims.

The reservoir tank pertaining to the present invention can be suitably utilized for a reservoir tank that stores hydraulic fluid and is used in a hydraulic pressure-actuated device such as a hydraulic brake device that utilizes hydraulic pressure such as oil pressure.

Further, the brake device pertaining to the present invention can be suitably utilized for a hydraulic brake device that uses the hydraulic fluid stored in the reservoir tank to apply a brake to a wheel.

What is claimed is:
1. A reservoir tank comprising:
   a hydraulic fluid supply opening portion for supplying hydraulic fluid;
   a hydraulic fluid supply portion provided in a lower section of the hydraulic fluid supply opening portion, to which hydraulic fluid is supplied from the hydraulic fluid supply opening portion;
   a hydraulic fluid storage chamber that stores the hydraulic fluid to be fed to a master cylinder as a result of the hydraulic fluid in the hydraulic fluid supply portion being supplied thereto via a hydraulic fluid passage; and a cylindrical portion that has the hydraulic fluid supply opening portion at one end and is disposed in a vertical direction between the hydraulic fluid supply opening portion and the hydraulic fluid supply portion and has inside a chamber that is in communication with the hydraulic fluid supply portion, wherein the cylindrical portion includes on an inside thereof a chamber that is in communication with the hydraulic fluid supply portion, a volume-augmented chamber forming portion is disposed on the hydraulic fluid supply opening portion side of in the cylindrical portion and has inside a volume-augmented chamber that is in communication with the chamber of the cylindrical portion, and at least part of the volume-augmented chamber is positioned above a MAX line that is a maximum storage level of the hydraulic fluid.

2. The reservoir tank according to claim 1, wherein the volume-augmented chamber forming portion is disposed so as to extend horizontally or substantially horizontally from the cylindrical portion.

3. The reservoir tank according to claim 2, wherein the volume-augmented chamber forming portion is disposed so as to extend into a dead space when the reservoir tank is installed in a vehicle.

4. The reservoir tank according to claim 3, wherein the volume-augmented chamber forming portion is disposed so as to extend above the hydraulic fluid passage.

5. A brake device comprising:
a reservoir tank that stores hydraulic fluid;
a master cylinder to which the hydraulic fluid inside the reservoir tank is supplied and which generates brake pressure when it is actuated; and
a brake cylinder that is actuated by hydraulic pressure from the master cylinder,
wherein the reservoir tank is the reservoir tank according to claim 4.

6. A brake device comprising:
a reservoir tank that stores hydraulic fluid;
a master cylinder to which the hydraulic fluid inside the reservoir tank is supplied and which generates brake pressure when it is actuated; and
a brake cylinder that is actuated by hydraulic pressure from the master cylinder,
wherein the reservoir tank is the reservoir tank according to claim 3.

7. A brake device comprising:
a reservoir tank that stores hydraulic fluid;
a master cylinder to which the hydraulic fluid inside the reservoir tank is supplied and which generates brake pressure when it is actuated; and
a brake cylinder that is actuated by hydraulic pressure from the master cylinder,
wherein the reservoir tank is the reservoir tank according to claim 2.

8. The reservoir tank according to claim 1, wherein a bottom portion of the volume-augmented chamber slants so as to become a downward slope toward the chamber inside the cylindrical portion.

9. A brake device comprising:
a reservoir tank that stores hydraulic fluid;
a master cylinder to which the hydraulic fluid inside the reservoir tank is supplied and which generates brake pressure when it is actuated; and
a brake cylinder that is actuated by hydraulic pressure from the master cylinder,
wherein the reservoir tank is the reservoir tank according to claim 8.

10. A brake device comprising:
a reservoir tank that stores hydraulic fluid;
a master cylinder to which the hydraulic fluid inside the reservoir tank is supplied and which generates brake pressure when it is actuated; and
a brake cylinder that is actuated by hydraulic pressure from the master cylinder,
wherein the reservoir tank is the reservoir tank according to claim 1.

* * * * *